United States Patent [19]
Brock et al.

[11] Patent Number: 5,805,942
[45] Date of Patent: Sep. 8, 1998

[54] HORIZONTAL HEAD ASSEMBLY AND SUSPENSION METHOD FOR MAGNETICALLY COATED FILM RECORDING

[75] Inventors: George W. Brock, La Jolla; Sheldon W. Hower; Jeremiah F. Connolly, both of San Diego, all of Calif.

[73] Assignee: Eastman Kodak Company, Rochester, N.Y.

[21] Appl. No.: 903,402

[22] Filed: Jul. 30, 1997

[51] Int. Cl.⁶ .................................................. G03B 17/24
[52] U.S. Cl. ............................................ 396/319; 396/320
[58] Field of Search ...................................... 396/310, 311, 396/312, 319, 320; 360/104, 105, 109

[56] References Cited

U.S. PATENT DOCUMENTS

| | | | |
|---|---|---|---|
| 4,933,780 | 6/1990 | Wash et al. | 396/319 |
| 4,996,546 | 2/1991 | Pagao et al. | 396/319 |
| 5,005,031 | 4/1991 | Kelbe | 396/320 |
| 5,016,030 | 5/1991 | Dwyer et al. | 396/319 |
| 5,028,940 | 7/1991 | Pearson | 390/320 |
| 5,272,498 | 12/1993 | Wakabayashi | 396/320 |
| 5,274,522 | 12/1993 | Taillie | 360/130.3 |
| 5,307,100 | 4/1994 | Kubo | 396/319 |
| 5,351,102 | 9/1994 | Tsuji et al. | 396/320 |
| 5,353,078 | 10/1994 | Aoshima | 396/320 |
| 5,477,290 | 12/1995 | Takeshita | 396/319 |
| 5,483,312 | 1/1996 | Wada | 396/320 |
| 5,502,528 | 3/1996 | Czarnecki et al. | 396/319 |
| 5,555,043 | 9/1996 | Brock et al. | 396/320 |
| 5,559,568 | 9/1996 | Kazami et al. | 396/320 |

FOREIGN PATENT DOCUMENTS

| | | |
|---|---|---|
| 6-289501 | 10/1994 | Japan . |
| 7333723 | 12/1995 | Japan . |
| 92/21126 | 11/1992 | WIPO . |

*Primary Examiner*—Eddie C. Lee
*Attorney, Agent, or Firm*—William F. Noval

[57] ABSTRACT

In a photographic system including means for magnetically recording/reproducing data relative to magnetically coated film, an assembly for conforming a thin film magnetic head array to the nonplanar magnetic surface during data transfer only, the assembly comprising: a platen for holding magnetically coated film in a film plane; a magnetic head array including first and second thin film heads located side-by-side and a third thin film head located fore or aft the first and second heads and forming an equilateral triangle of their centers; a head mounting spring fixed at one end to the platen and having a free end for mounting the magnetic head array adjacent to magnetically coated film transported through the film plane the mounting spring allowing pitch and roll movement of the head assembly; and a loading spring for biasing the magnetic head array into contact with the magnetically coated film so that the point of contact is at the center of gravity of the three head magnetic head array.

4 Claims, 5 Drawing Sheets

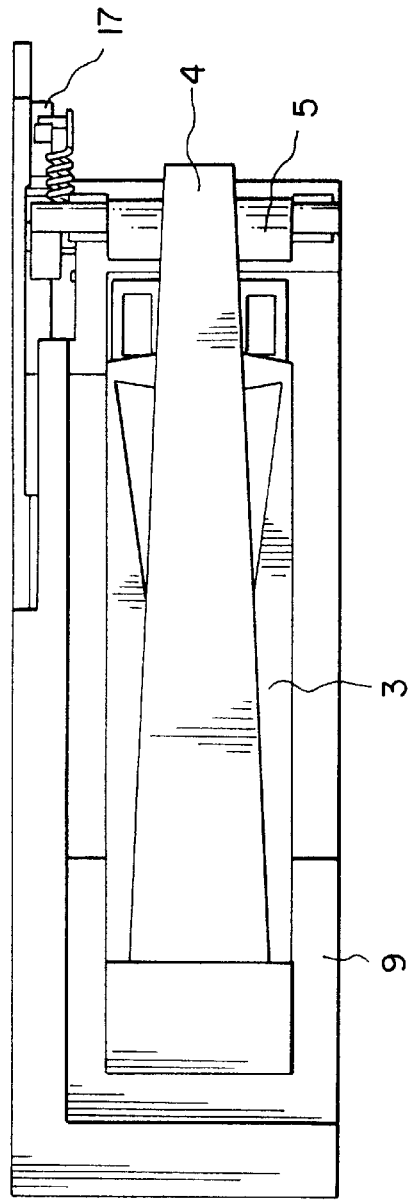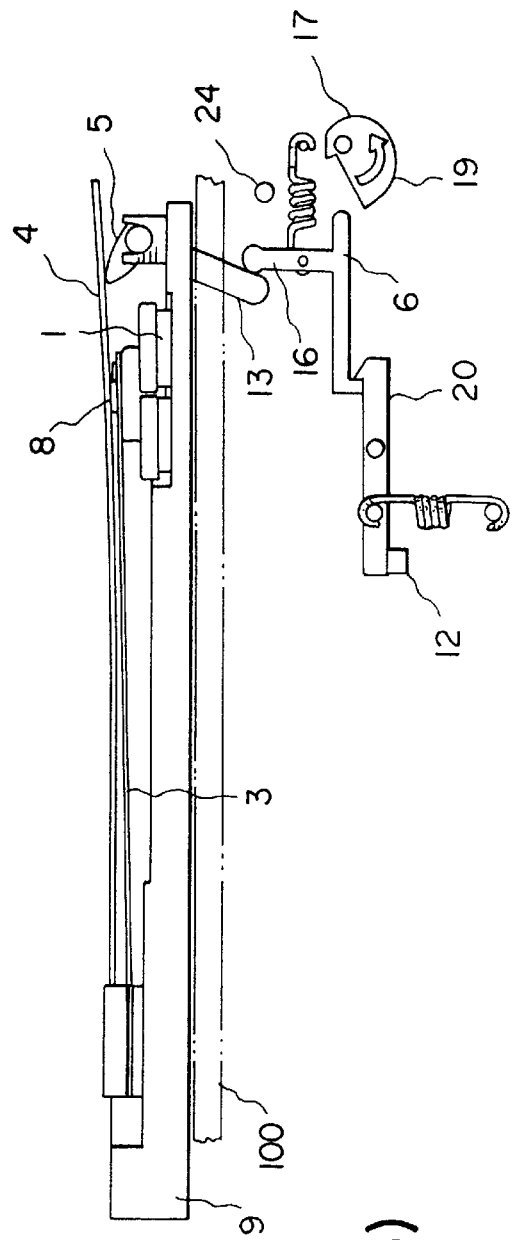
Fig.4(a)
Fig.4(b)

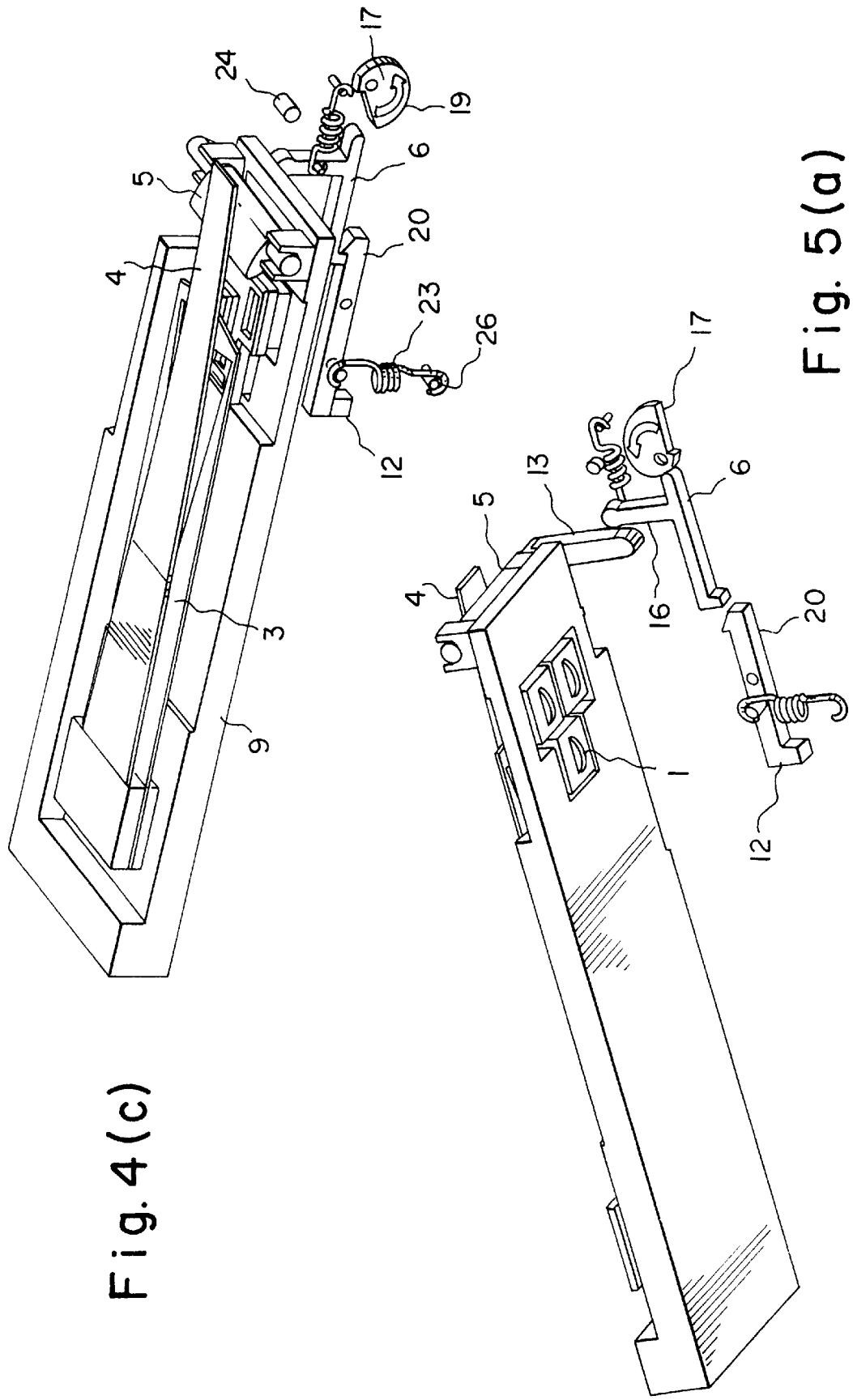

HORIZONTAL HEAD ASSEMBLY AND SUSPENSION METHOD FOR MAGNETICALLY COATED FILM RECORDING

FIELD OF THE INVENTION

This invention relates in general to photographic apparatus and more particularly to a horizontal head assembly and suspension technique for magnetically coated film recording.

BACKGROUND OF THE INVENTION

In the magnetic recording interface for flexible media, such as magnetic tape, it is usual to wrap the recording head contour with the media in order to create an angle of wrap of the medium around the recording gap. However, this is not possible if a horizontal thin film recording head technology structure is used. The horizontal head structure has been of considerable interest in recent years since it reduces the head fabrication post processing that is normally required for traditional vertical thin film head structures. Thus, the challenge arises as to what type of horizontal head contour to use with flexible media applications.

The horizontal thin film head structure has a large area of planarity at its contact region, with its magnetic write gap only slightly raised above its surroundings, while the magnetic read head is flat, using magneto-resistive sensing. Accordingly, it is not possible to wrap flexible media about the flat head, so it is necessary to conform the head surface to the recording medium by other means.

In the case of the Advanced Photograph System film, which has a magnetic layer on the non-emulsion side, the film, due to its very high stiffness has some characteristics of both rigid and flexible media. It would be desirable to use the rigid characteristics of the media to obtain compliance to the horizontal head structure to ensure uniform contact pressure at the head gaps.

The following patents do not provide a solution to these problems:

U.S. Pat. Nos. 5,555,043; 5,502,528; 4,933,780; 4,996,546; 5,005,031; 5,016,030; 5,028,940; 5,274,522; 5,272,498; 5,307,100; 5,477,290; 5,351,102; 5,483,312; and 5,353,078; EP Patent 433,019; JP Patents 7,333,723 and 6,289,501; and PCT Patent Application WO 9,221,126.

SUMMARY OF THE INVENTION

According to the present invention, there is provided a solution to the problems of the prior art.

According to a feature of the present invention, there is provided a photographic system including means for magnetically recording/reproducing data relative to magnetically coated film, an assembly for conforming a thin film magnetic head array to the nonplanar magnetic surface during data transfer only, the assembly comprising: a platen for holding magnetically coated film in a film plane; a magnetic head array including first and second thin film heads located side-by-side and a third thin film head located fore or aft the first and second heads and forming an equilateral triangle of their centers; a head mounting spring fixed at one end to the platen and having a free end for mounting the magnetic head array adjacent to magnetically coated film transported through the film plane the mounting spring allowing pitch and roll movement of the head assembly; and a loading spring for biasing the magnetic head array into contact with the magnetically coated film so that the point of contact is at the center of gravity of the three head magnetic head array.

ADVANTAGEOUS EFFECT OF THE INVENTION

The invention has the following advantages.

1. A horizontal thin film head is suspended in contact with magnetically coated film to ensure uniform contact pressure at the head gaps.
2. The magnetic heads only contact the film during data transmission. This provides low friction threading of the leading film edge through the camera gate, reduces the sliding contact of the head on the film surface, and eliminates film damage dimples caused by long dwelling of the head on the film surface.

BRIEF DESCRIPTION OF THE DRAWINGS

FIG. 4 shows the head out of contact with the film.

DETAILED DESCRIPTION OF THE INVENTION

Figure 1:
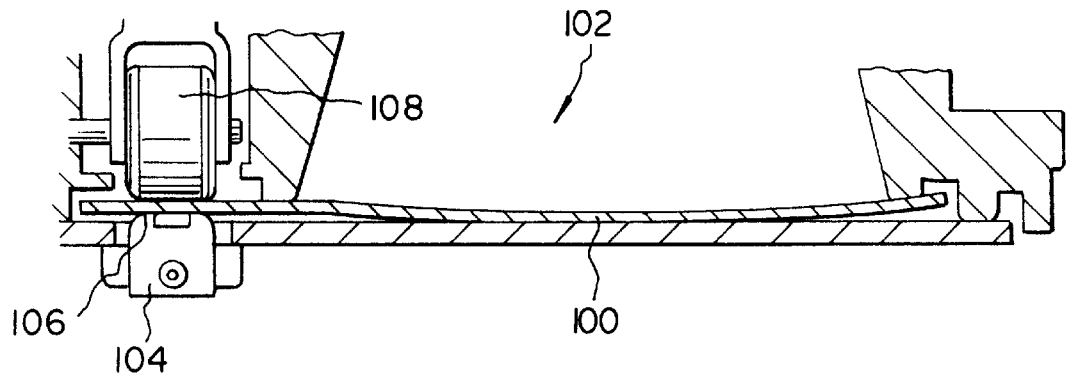
FIG. 1 is an elevational, sectional view showing the transverse shape of the film in camera gate.

As shown in FIG. 1, photographic film 100 is thrust into the camera frame 102, its transverse shape to a first approximation is that shown with small variations in planarity in the transverse direction. This shape will vary wits temperature, humidity, and the length of time the film 100 spends in the camera frame 102, and prior film storage history. All of these variables affect the longitudinal and cross curvature of the film 100 and, hence, its planarity in the camera gate 102. The planarity of the film 100 is also affected by variations in the manufacturing process resulting in small changes in film thickness and flatness. These variations, while not critical to the photographic capability of the film, can be critical to the magnetic recording capability on the film. As shown, head 104 engages film 100 by contact pressure of backer 108. In the case of recording head contours 106 of head 104 having a convex radius, the wrapping of film around the contour has the effect of straightening the cross curvature of the film in the narrow zone in the vicinity of the head gap.

Figure 2A:
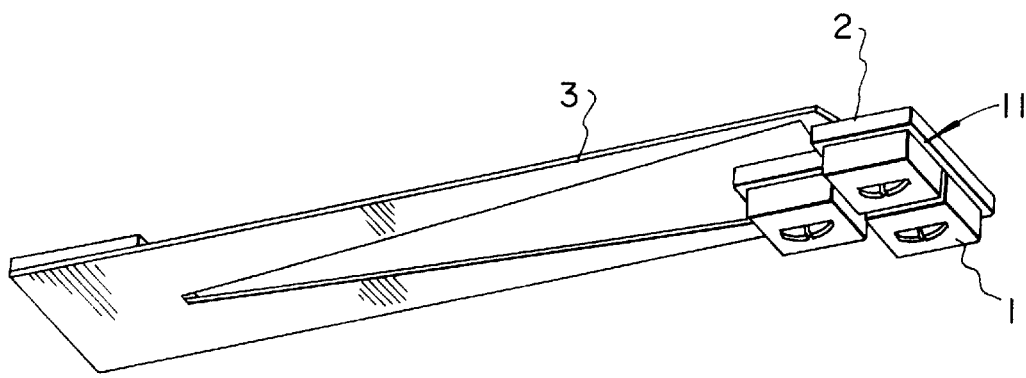
FIG. 2 shows the head assembly and suspension.
Figure 2B:
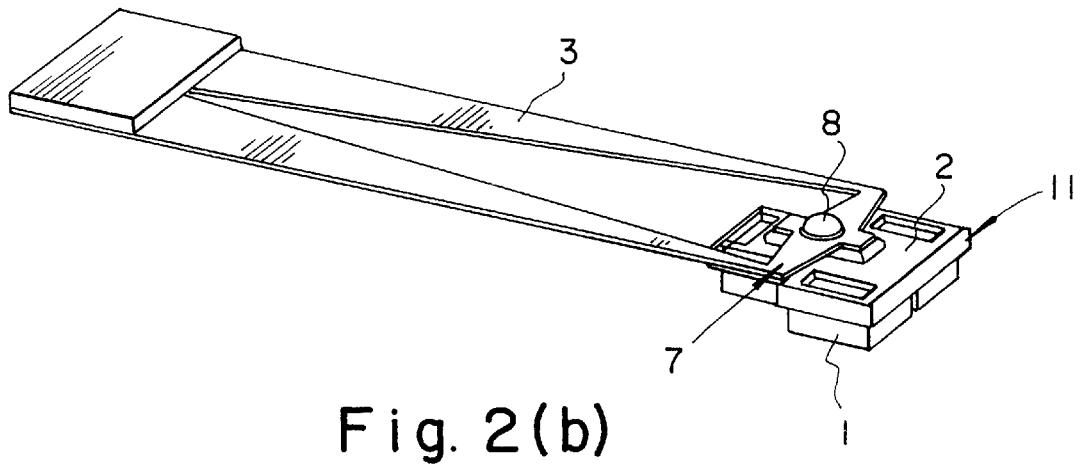

A head assembly and suspension system according to the invention is shown in FIGS. 2(*a*) and 2(*b*). A horizontal head 1 of a thin film three head array is essentially flat, having been individually diced from a planar wafer containing rows of the horizontal thin film heads, deposited by a thin film process. The separate horizontal heads 1 are arranged to give a three point contact system, which is well known for the ability of each contact point to comply to any shape of surface. Depending on the requirements of the recording system, layout of the heads 1 may be mounted as a single head element with two dummy structures, or as a two-head structure with one dummy structure. The dummy may be-produced as an integral part of the holding structure if it is produced by injection molding of a ceramic or other material. The three heads form an equilateral triangle of their centers, which conform to the nonplanar surface of film 100 during data transfer.

Figure 3:
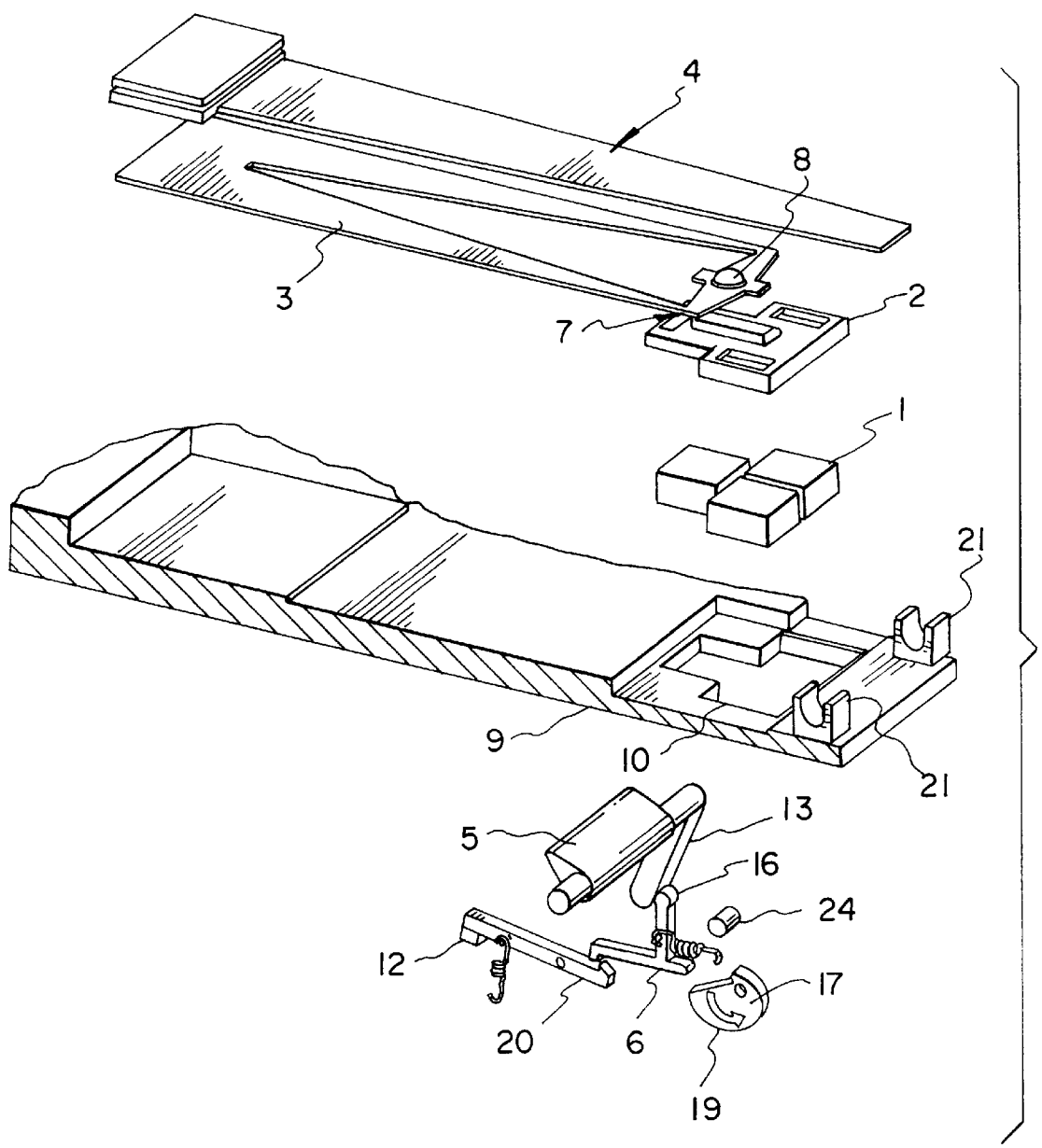
FIG. 3 shows the major components of the head assembly suspension.

FIG. 3 shows the component parts an embodiment of the invention:

The individual magnetic head 1 or dummy supports.

The ceramic molding 2 that holds the horizontal head die.

The mounting spring 3 for holding the head assembly structure. This allows for roll motion by different deflections of the side springs, and for pitch motion by rotation of the end of transverse member 7.

The vertical loading spring 4 for the head contact force so that the point of contact of heads 1 is at the center of gravity of the three head array.

The cam 5 to load/unload the heads 1 on the photographic film 100 (FIG. 4(b)).

The lever arm 6 for rotating the cam 5, via arm 13.

Pitch spring 7 (part of 3) for the head structure.

Raised spherical bead 8 allowing the force generated by the vertical loading spring 4, to go through the center of gravity of the head assembly structure.

Cut away of the platen 9 confining the film 100 (FIG. 4(b)) showing the openings for the heads 1 and spring structure.

Cavity 10 to allow head assembly motion.

Shoulders 11 on the ceramic molding 2 stop (see FIG. 2) at the edge of the cavity 10, to provide a thrusting limit on the penetration of the head assembly into the film surface.

Shutter release 12.

The spring 3 provides yaw stability to the three point structure, while at the same time allowing slight pitch and roll capability to the three point structure to ensure a three point contact, accommodating small deviations in a horizontal recording plane.

FIGS. 4(a)–4(c) show the head in the unloaded, noncontact position. The load spring 4 is raised by the cam 5, which allows the spring 3 to raise or lower the head relative to the film surface.

Figure 5B:
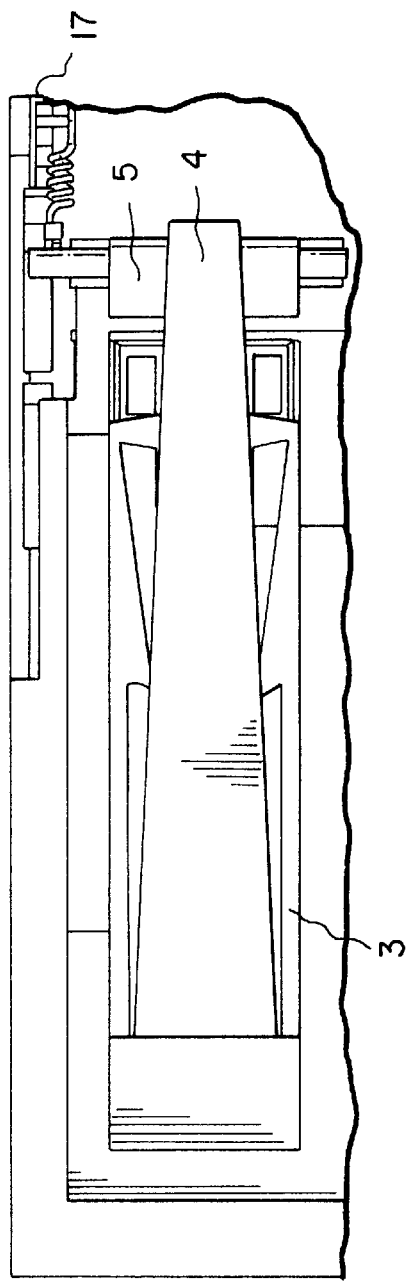
FIG. 5 shows the head assembly when the heads are contacting the film surface.
Figure 5C:
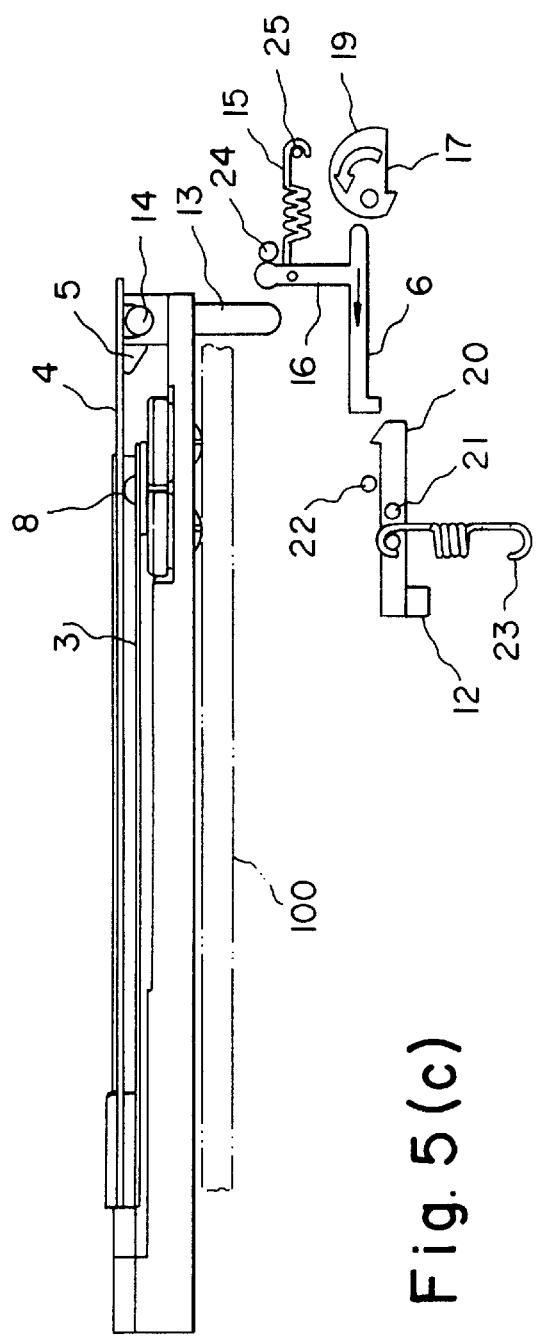

FIGS. 5(a)–5(c) shows the head assembly when the head gaps of heads 1 are contacting the film surface. The cam 5 is lowered by action of the lever 6 which allows the load spring 4 to contact the spherical load bead 8 and penetrate the head assembly to the film's magnetic surface. Shoulders 11 (see FIGS. 2 and 3) at the edge of the cavity 10 provide a thrusting limit on the penetration of the head assembly into the film surface.

To provide for a low friction threading of the leading film edge through the camera gate, or other similar structure, and for reducing the sliding contact of the head on the film surface, and for removing film damage dimples caused by long dwelling of the head on the film surface, the heads 1 only contacts the film 100 during data transmission. At all other times the heads 1 are raised above the film 100 confining surface of the platen 9. This state represents the unpowered and unloaded, nominal position state of the head assembly.

The head raising and lowering assembly is as follows. The cam 5 and lever arm 13 are one unit. The lever 13 is mounted on axis 14 and biased counterclockwise by spring 4 acting on the cam 5 toward the position shown in FIGS. 5(a)–(c) which allows the spring 4 to load the spherical bead 8 on the head assembly, and hence engage the heads onto the film magnetic surface with a bias force of 28 to 60 grams. A second lever 6 is biased to the right by a spring 15 mounted on the camera body for rectilinear movement. The lever 6 has a arm 16 which engages a stop 24 under the influence of spring 15. A cam 17 has a cam rise 19, which upon rotation of the cam 17, will engage lever 6 and displace it to the left to lock onto lever 20. During such movement, the angled end of lever 6 will move by the latch portion of pivotal lever 20, mounted on a pin 21, and raised into engagement with a stop 22 by a spring 23. The angled end of lever 6 will become latched in the position shown in FIG. 4 and the lever 13 will be held in the position shown, to unload the heads from the film. The lever 20 can subsequently be rotated clockwise against the tension of spring 23 to enable the parts to return to the position shown in FIG. 5 with the heads loaded onto the film.

In operation, the lever 13 will assume the position shown in FIGS. 5(a)–(c) to allow the spring 4 to load the heads onto the film magnetic surface while the film 100 is in motion.

Near the end of advance of the film frame, rise 19 of cam 17 will engage lever 6 and displace it to the left until its angled end is latched by the end of lever 20. The parts will assume the position shown in FIG. 4 and the heads will now be unloaded from the film surface. At the end of the film exposure of a frame, the shutter release mechanism 12 will actuate lever 20 to release lever 6 so that the parts will again assume the position shown in FIG. 5 during the advancement of the next frame to an exposure position. The heads 1 are thus held into engagement with the film during film advancement to assure adequate magnetic coupling between heads and magnetic coating, and released during film exposure to prevent distortion of the film plane, reduced sliding friction, and elimination of the impact of the film leader edge on heads projecting into the film path during film loading.

The present invention can be incorporated into any photographic apparatus such as a camera, photofinishing equipment, magnetic reader/writer computer peripheral and a film digital scanner.

The present invention has been described in detail with particular reference to a preferred embodiment thereof, but it will be understood that variations and modifications can be effected within the spirit and scope of the invention.

PARTS LIST 1 horizontal head
2 molded holding structure
3 mounting spring
4 vertical loading spring
5 cam
6 lever arm
7 pitch spring
8 spherical bead
9 platen
10 cavity
11 shoulders
12 shutter release
13 lever arm
14 cam pivot
15 spring
16 arm
17 cam
19 cam rise
20 lever
21 cam pivot supports
22 stop
23 spring
24 stop
25 pin
26 pin 100 film
102 camera frame
104 head
106 recording head contours
108 backer

What is claimed is:

1. In a photographic system which uses magnetically coated film, an assembly comprising:

a platen for holding magnetically coated film in a film plane;

a magnetic head array including first and second thin film heads located side-by-side and a third thin film head located fore or aft said first and second heads, said first, second and third heads having centers and forming an equilateral triangle of their centers;

a head mounting spring which is fixed at one end to said platen and which has a free end for mounting said magnetic head array adjacent to magnetically coated film transported through said film plane wherein said mounting spring allows pitch and roll movement of the magnetic head array; and a loading spring for biasing said magnetic head array into contact with said magnetically coated film so that said heads make a three point contact with said magnetically coated film which is at the center of gravity of said three head magnetic head array.

2. The photographic apparatus of claim 1 including means for moving said loading spring out of biasing engagement with said magnetic head array while said film is stationary.

3. The photographic apparatus of claim 2 wherein said means for moving includes a cam assembly which engages said loading spring to move said spring out of contact with said magnetic head array.

4. The photographic apparatus of claim 1 wherein one or more of said magnetic heads can be a dummy structure.

* * * * *